United States Patent [19]

Bax

[11] Patent Number: 4,683,413

[45] Date of Patent: Jul. 28, 1987

[54] REDUCING POWER CONSUMPTION AND MONITORING SYNCHRONOUS RUNNING OF THREE-PHASE ELECTRIC MOTORS

[75] Inventor: Anton M. Bax, Forthampton, England

[73] Assignee: Smiths Industries Public Limited Company, London, England

[21] Appl. No.: 783,400

[22] Filed: Oct. 3, 1985

[30] Foreign Application Priority Data

Oct. 3, 1984 [GB] United Kingdom ................. 8424989

[51] Int. Cl.[4] .............................................. H02P 5/28
[52] U.S. Cl. .................................... 318/779; 318/729; 323/910
[58] Field of Search ............... 318/729, 778, 779, 799; 323/910, 288, 289, 901; 361/76

[56] References Cited

U.S. PATENT DOCUMENTS

| | | | |
|---|---|---|---|
| 3,536,957 | 10/1970 | Iverson et al. | 361/33 |
| 3,684,936 | 8/1972 | Graf | 318/778 |
| 3,976,919 | 8/1976 | Vandevier et al. | 361/76 X |
| 4,242,625 | 12/1980 | Hedges | 323/910 X |
| 4,333,046 | 6/1982 | Lee | 323/910 X |
| 4,422,030 | 12/1983 | McAllise | 318/779 |
| 4,482,853 | 11/1984 | Bhavsar | 318/778 |

Primary Examiner—Patrick R. Salce
Assistant Examiner—Marc S. Hoff
Attorney, Agent, or Firm—Pollock, Vande Sande & Priddy

[57] ABSTRACT

A control system for a three-phase motor has two triac switches connected in respective supply lines to the motor. Both switches are initially closed so that power is supplied to the motor on all three lines. After a predetermined time, when the motor has reached its operating speed, one switch is opened by a logic unit so that single phase power is supplied to the motor on two lines. One of the switches is subsequently periodically closed for short intervals, and the other switch is periodically opened for short intervals under control of a monostable unit, so as to produce hunting of the motor. Hunting of the motor is detected by a speed monitor responsive to the counter EMF of the motor. The system has a phase detector responsive to the phase relationship between signals on the supply lines which prevents the switches being closed if there is not the desired phase relationship between the signals.

10 Claims, 4 Drawing Figures

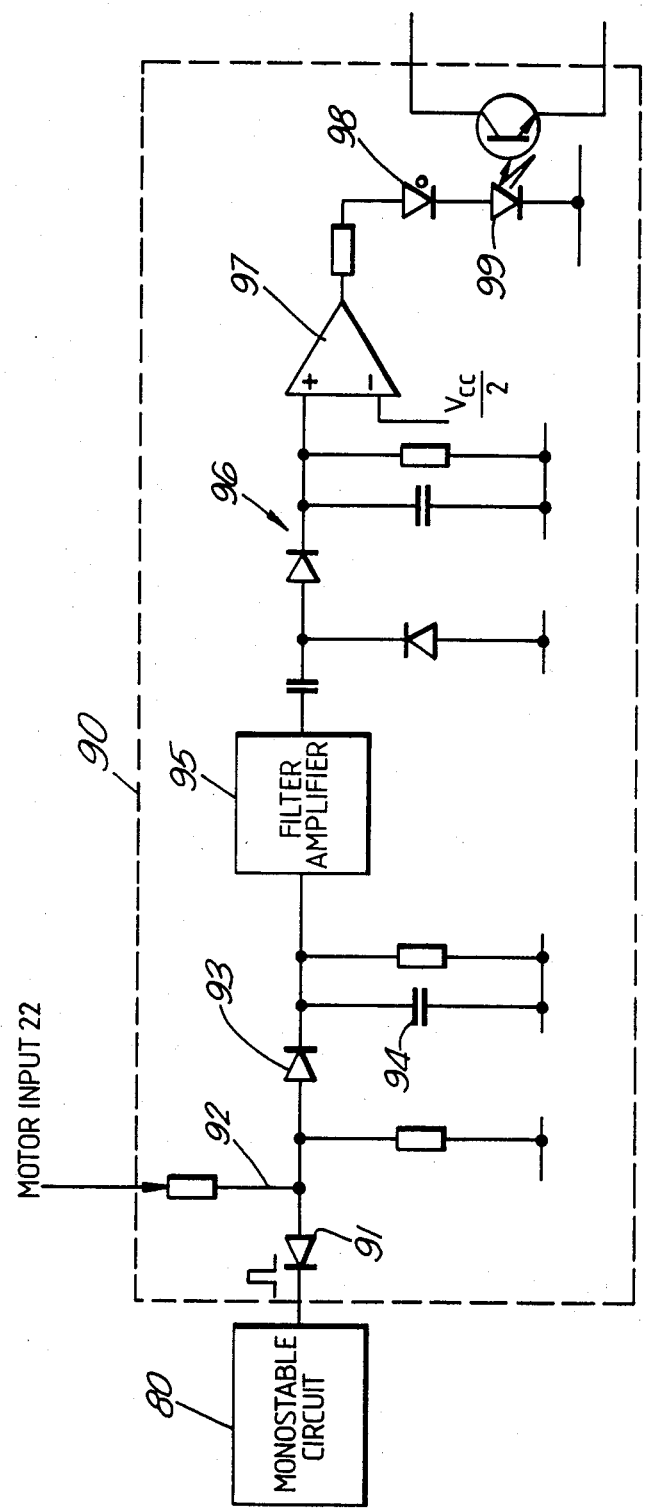

REDUCING POWER CONSUMPTION AND MONITORING SYNCHRONOUS RUNNING OF THREE-PHASE ELECTRIC MOTORS

BACKGROUND OF THE INVENTION

This invention relates to motor control systems and methods.

The invention is more particularly concerned with control systems for three-phase motors.

In some applications it is important that motors rapidly reach their operating speed, such as, for example, with motors driving hydrodynamic gas-lubricated bearings which are only subjected to wear before the gas film is fully established between the bearing surfaces. For this reason, it has been the practice to supply such motors at high power to ensure rapid start up. This, however, leads to high power consumption and high operating temperatures which can adversely affect the motor or the system in which it is included.

Another difficulty met in three-phase motor systems is that of determining whether or not the motor is running in synchronism with the power supply.

BRIEF SUMMARY OF THE INVENTION

It is an object of the present invention to provide a motor control system which can be used to produce a rapid start up but has a reduced power consumption.

According to one aspect of the present invention, there is provided a motor control system having three phase supply lines, switching means connected in one of said supply lines, and control means arranged to control operation of said switching means such that power supplied to said motor on said one line can be interrupted or enabled.

According to another aspect of the present invention, there is provided a motor control system having three phase supply lines, switching means connected on one of said supply lines, control means arranged to control operation of said switchiang means such that said switching means is initially closed and power is supplied to said motor on all said lines, said control means being arranged to open said switching means when said motor has reached a predetermined speed so that power supply to said motor on said one line is thereby interrupted.

The control means preferably includes timing means, the timing means being arranged to cause said switching means to open after a predetermined time. The switching means may be subsequently closed to enable power supply to the motor on said one line for short intervals such as to cause hunting of the motor.

According to a further aspect of the present invention, there is provided a motor control sytem having three phase supply lines; switching means connected in one of said supply lines; control means arranged to control operation of said switching means such that the supply of signals on said one supply line is intermittently varied by periodically interrupting or enabling the supply of signals to said motor for short intervals such as to cause hunting of the motor; and means for detecting hunting of the motor.

The control system preferably includes further switching means connected in another of said supply lines, and means for controlling said further switching means such that supply of signals on the other of said supply lines is periodically interrupted for short periods to produce hunting of the motor. The control system may also include means responsive to the counter EMF of the motor so as to enable hunting of the motor to be detected.

The control system may include switching means connected in each of at least two of the supply lines, and phase detector means responsive to the phase relationship between signals on the said two of the supply lines, the phase detector means being arranged to cause the switching means to open and thereby prevent supply of power to said motor when an undesired phase relationship occurs between said signals. The control system may include a unidirectional current device associated with each said switching means, each said unidirectional current device having one electrode connected to a control input of the switching means, and the phase detector means being arranged to cause the unidirectional current devices to become conductive when an undesired phase relationship occurs between the signals such that signals from the control means are prevented from closing the switching means thereby preventing supply of power to the motor.

The phase detector means may include a series connected capacitor and a unidirectional current device, signals derived from one of the supply lines being supplied to charge the capacitor via the unidirectional current device, and signals derived from the other of the supply lines controlling the unidirectional current device such as to prevent charging of the capacitor when an undesired phase relationship exists between signals on the one and other supply lines.

The switching means, or each switching means, may include a triac. Preferably the switching means includes two triacs, one triac being connected in the supply line associated with the respective switching means, the other triac being connected to the gate of the triac, and signals from the control means being supplied to the gate of the other triac to control switching thereof.

The motor may be arranged to drive gas - lubricated bearings.

According to another aspect of the present invention, there is provided a method of controlling a three-phase motor, power being supplied to the motor on all three phase lines until the motor has reached a predetermined speed, and power on one of the lines being subsequently interrupted.

Power on the one phase line may be interrupted after a predetermined time.

According to a further aspect of the present invention, there is provided a method of controlling a three-phase motor, the supply of power on one supply line to the motor being intermittently varied by periodically interrupting or enabling the supply of power to the motor for short intervals such as to cause hunting of the motor, and hunting of the motor being detected.

Power may be supplied to the motor on all three phase lines until the motor has reached a predetermined speed, power on one of said phase lines being subsequently interrupted so that the motor runs on power on only the other two lines, power on said one line being subsequently periodically enabled for short intervals such as to cause hunting of the motor, and hunting of the motor being detected.

Power on one of the other two lines may be periodically interrupted for short intervals such as to cause hunting of the motor.

A motor system including a control circuit, in accordance with the present invention, will now be described, by way of example, with reference to the accompanying drawings.

BRIEF DESCRIPTION OF THE DRAWINGS

FIG. 4 shows a different part of the control circuit.

DETAILED DESCRIPTION

Figure 1:
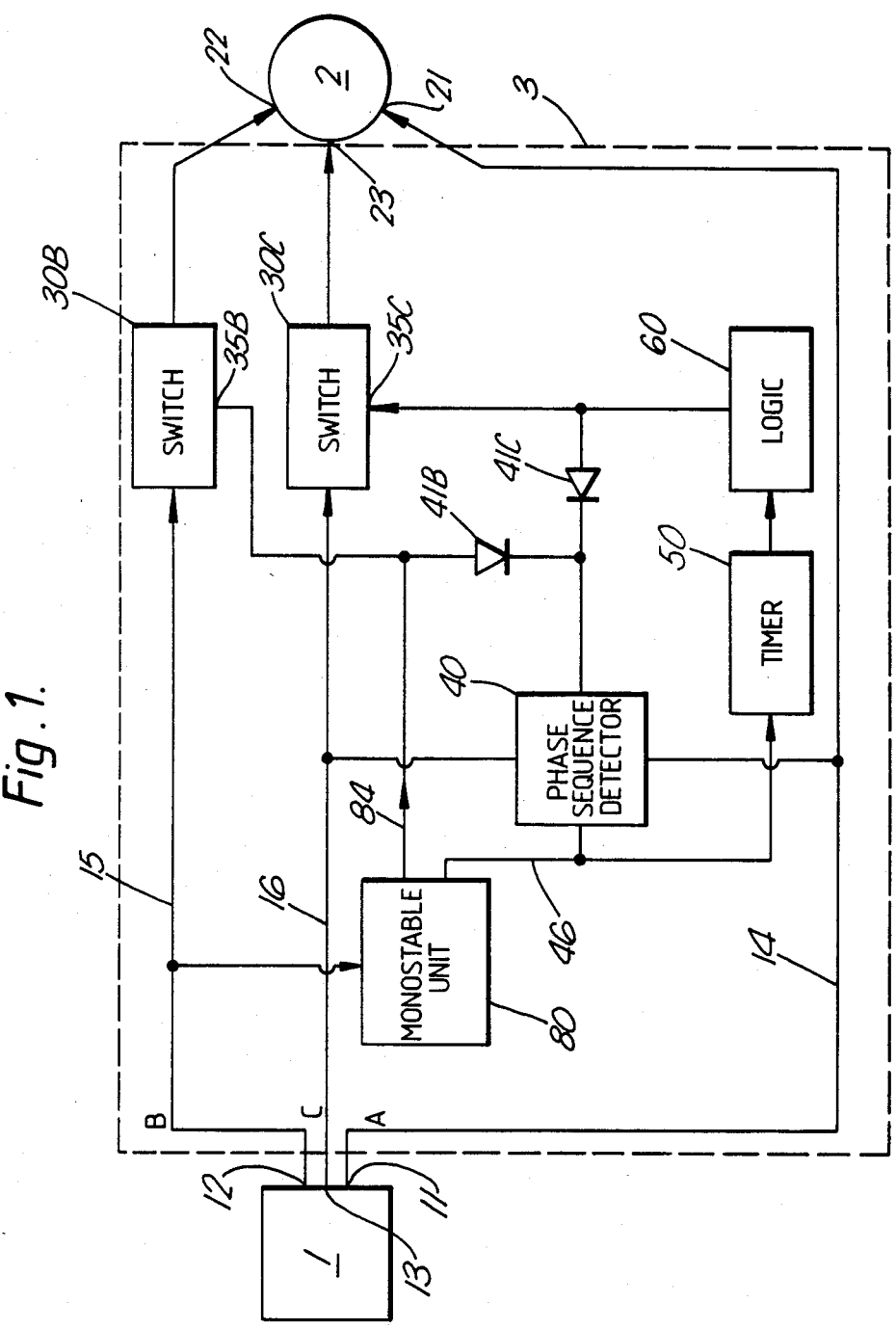
FIG. 1 shows the system schematically.

With reference to FIG. 1, the motor system comprises a three-phase power supply 1 that drives a motor 2 via a control circuit 3. The motor 2 is of a kind which must be driven in a predetermined sense and, for example, may be used to rotate a gyroscope inertia member mounted on hydrodynamic gas-lubricated bearings. One of the purposes of the control circuit 3 is to ensure that the motor 2 will not be driven by the wrong phase input signals. The control circuit 3 is preferably mounted inside the same casing containing the motor 2, as a factory-assembled unit, so that the unit may be subsequently connected to the power supply without the risk of damage to the motor. In this respect, it has been found that, in many cases, three-phase power supplies have outputs that are incorrectly labelled; the control circuit 3 thereby ensures that the motor 2 is not damaged however the supply is connected.

Signals 'A' from one of the outputs 11 of the power supply 1 are supplied directly to an input 21 of the motor 2, via line 14. Application of the other signals 'B' and 'C', from outputs 12 and 13 of the power supply, to the other inputs 22 and 23 of the motor, are controlled by switches 30B and 30C respectively in lines 15 and 16. The control circuit 3 includes a phase-sequence detector unit 40, which is described in more detail below, and which controls operation of the switches 30B and 30C such that they are open (that is, off) preventing passage of signals B and C to the motor 2, when the signals do not bear the correct phase relationship to one another.

The control circuit 3 also includes a timing unit 50 and a logic unit 60 which are connected to the switch 30C. These operate to open the switch 30C, preventing supply of signals C to the motor 2, after the motor has reached its operating speed, so that the motor runs only on the signals B, thereby reducing power consumption and lowering its operating temperature. The logic unit 60 also closes the switch 30C for brief periods, so that short pulses are supplied to the motor, to cause hunting of the motor for purposes that are described later. A monostable unit 80 in the control circuit 3 causes the switch 30B to be opened for brief periods for a similar purpose.

Figure 2:
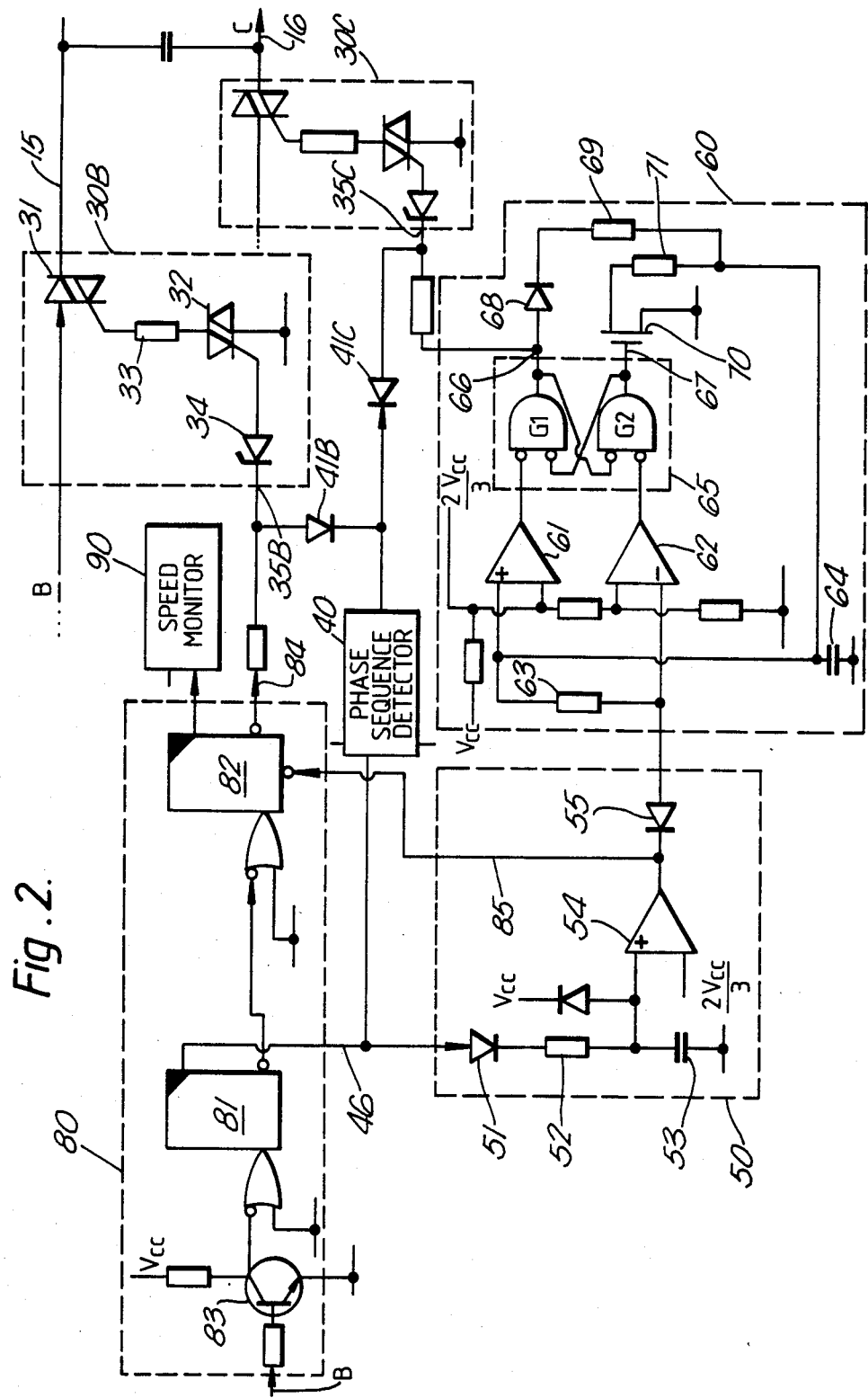
FIG. 2 shows the control circuit in greater detail.

The control circuit 3 will now be described in greater detail with reference to FIG. 2. Both switches 30B and 30C are of the same construction and include a first triac 31 connected in line 15 or 16, and a second triac 32 connected to the gate of the first triac via a current limiting resistor 33. A zener diode 34 is connected in series with the gate of the second triac 32 and the control input 35 of the switch 30. The switch 30B or 30C will thereby be closed, or turned on, by a high voltage at the control input 35. The zener diode 34 allows an increasd margin of control over a wide temperature range, since, at high temperatures, some triacs can trigger at low voltages.

The output of the phase sequence detector 40 is connected to the control inputs 35B and 35C of the switches 30B and 30C respectively via diodes 41B and 41C, which have their anodes connected to the switches. When the output of the detector 40 is high, the diodes 41 pass no current and the switches 30B and 30C operate normally under control of signals supplied to their control inputs 35 from the monostable unit 80 and the logic unit 60 respectively. When, however, the output of the detector 40 is low, signals supplied to the control inputs 35 are diverted through the diodes 41 so that the switches 30B and 30C remain off. The detector 40 is arranged to produce a high output when it detects a correct phase relationship between signals B and C, and to produce a low output when this relationship is not correct, thereby preventing the signals reaching the motor 2.

Figure 3:
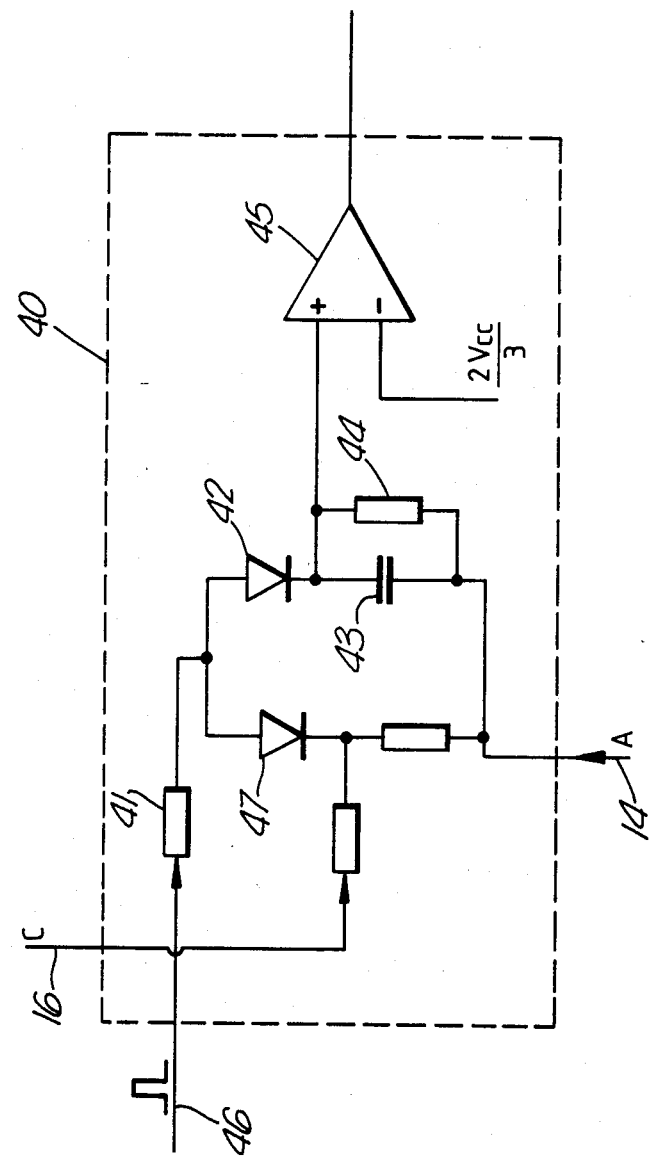
FIG. 3 shows a part of the control circuit.

The construction of the phase sequence detector 40 is shown in FIG. 3. The detector 40 includes a diode pump circuit having a series connected resistor 41, diode 42 and capacitor 43. An additional resistor 44 is connected in parallel with the capacitor 43 to discharge it when the system is switched off. The capacitor 43 is connected to the positive input of a comparator 45, the negative input of which is connected to a source of voltage 2Vcc/3, Vcc being the DC supply voltage derived from either B or C with respect to A. The diode pump circuit is charged by pulses from the monostable unit 80 on line 46. The monostable unit 80 produces a short pulse every time the signal B makes a zero crossing in the positive direction. The anode of the diode 42 is also connected to the anode of a second diode 47, the cathode of which receives the signals C from line 16. If, therefore, the signal C is low when a pulse is produced on line 46, the diode 42 will be held off and the capacitor 43 will not be charged. If, however, the signal C is high, the diode 47 will be back biased and the capacitor 43 will be charged by pulses on line 46. The output of the comparator 45, and hence of the detector 40, will be high if the signal C is high when the signal B crosses zero in a positive direction, that is, when the correct phase relationship exists between the signals B and C.

With reference now again to FIG. 2, the pulses from the monostable unit 80 on line 46 are also supplied to the timing unit 50. The timing unit 50 includes a series connection of a diode 51, resistor 52 and capacitor 53, to which the pulses are supplied. The charge on the capacitor 53 is supplied to the positive input of a comparator 54, the negative input of which is connected to a source of voltage 2Vcc/3. The output of the comparator 54 is connected to the cathode of a diode 55, signals being supplied via the diode to the input of the logic unit 60. The capacitor 53 takes about ten seconds to be charged by the pulses on line 46 and, during this time the output of the comparator 54 is low, switching high at the end of this period.

The logic unit 60, which also performs a timing function, has two comparators 61 and 62. One comparator 62 has its negative input connected to the output of the timer 50, while the other comparator 61 has its positive input connected to the timer output via a resistor 63. A capacitor 64 is connected to the junction between the resistor 63 and the positive input of the comparator 61. The outputs of the comparators 61 and 62 are connected to a gating unit 65 having two gates G1 and G2 with respective outputs 66 and 67. The first output 66 is connected to the capacitor 64 via a diode 68 and resistor 69, while the second output 67 is connected to the capacitor via a transistor 70 and resistor 71. The first output 66 is also connected to the control input 35 of the switch 30C.

In operation, the logic unit 60 behaves as a double timer. When the output of the timer 50 is low, during the ten second timing period, the gate G1 will be open, producing a high voltage at its output 66 and hence maintaining the switch 30C on. When the output of the timer 50 goes high, the capacitor 64 is charged via resistor 69 with a time period of about ten milliseconds. After this time, the first comparator 61 snaps off, thereby closing gate G1 and opening gate G2. This causes the voltage at the output 66 to go low and the switch 30C to be turned off so that the motor 2 runs on only single phase signals B.

The output 67 of gate G2 is now high so that the transistor 70 is conductive. This causes the capacitor 64 to be discharged with a time period dictated by the value of the resistor 71 of about five seconds. During this time the motor 2 continues to run on single phase signals. When the capacitor 64 has been discharged, and the voltage at the positive input of the comparator 61 thereby goes low, the comparator turns on, switching on gate G1 and thereby producing a high value at the output 66. This causes the switch 30C to turn on again for a short period of about ten milliseconds while the capacitor 64 is being charged via resistor 69.

It will be seen, therefore, that after the initial ten second period of the timer 50, the switch 30C will be maintained off except for a short pulse of ten milliseconds duration, once every five seconds.

The switch 30B which controls supply of the signals B to the motor 2 is maintained on continuously, except for short intervals equal to about one sixth of the time period of the waveform of the signal B, under control of the monostable unit 80.

The monostable unit 80 has two monostable circuits 81 and 82 which are both supplied with the input signals B via a transistor 83. The monostable circuit 81 generates a very short output when the signal B passes through zero in the positive direction, and supplies this pulse on output line 46 to the phase sequence detector unit 40 and the timer 50. The second monostable circuit 82 generates a negative pulse every time the signal B passes through zero, whether in the positive or negative direction. The width of the pulse output from the second monostable circuit 82 is longer than that of the first monostable circuit, although still short compared with the waveform of signal B (typically approximately one sixth of the time period of the waveform of signal B). These negative output pulses are supplied to the control input 35B of the switch 30B, via line 84, so that it is turned off for the duration of each pulse. The second monostable circuit 82 also receives, at an inverting input, the output of the comparator 54 in the timing unit 50, via line 85. The comparator output is low during the first ten seconds of operation and acts to keep the output of the second monostable circuit 82 high so that supply of signals B to the motor on line 15 are uninterrupted during this period.

To summarise, if the supply 1 is correctly connected, the system applies full three-phase signals to the motor 2 for the first ten seconds from start up. After ten seconds, the signal C is cut off so that the motor 2 runs on single phase signals B, with a brief interruption twice every cycle. The signal C is, however, resupplied to the motor for about ten milliseconds, once every five seconds. In this way, the motor 2 reaches its operating speed as quickly as possible but, after this, runs at reduced power thereby reducing overall power consumption and lowering the operating temperature. The interruptions to the power supply encourage hunting of the motor, that is, low frequency oscillation about its running speed. In some applications this hunting is not desirable but in the present embodiment, it is used to check whether the motor is running in synchronism with the supply, in the manner described below.

With reference now to FIG. 4, there is shown a wheel speed monitor unit 90 which is supplied with positive pulses from the second monostable circuit 82, coincident with the negative pulses on line 84. This pulse input is supplied to the cathode of a diode 91. The anode of the diode 91 is connected to line 92 which in turn is connected to the input 22 of the motor 2 so as thereby to receive the back EMF from the motor. Line 92 is also connected, via the anode of a second diode 93 to one electrode of a capacitor 94 which is also connected and to the input of a bandpass filter and amplifier 95. The output of the filter 95 feeds a diode pump circuit 96 which is followed by a comparator 97. The output of the comparator 97 is supplied to an LED indicator 98 and to an optocoupler 99.

The diode 91 is rendered non-conductive by a positive pulse from the monostable circuit 82, that is, twice every cycle of the signal B, when the supply of the signal B to the motor is interrupted. During one of these pulses, the back EMF will be negative and hence blocked by the diode 93, so only positive samples of the back EMF are taken, once every cycle. These back EMF samples are supplied to the capacitor 94 which will be charged by any sinusoidal modulation of the voltage arising from hunting of the motor 2. The filter 95 is centered roughly on the expected frequency of the hunting, between 1 Hz and 30 Hz, and produces a square wave output, of 0 to Vcc when this hunting is detected. The diode pump circuit 96 is charged by any square wave signal and this charge produces an output at the comparator 97. The comparator output energises the LED 98, which is preferably mounted on the system casing, and the optocoupler 99 which provides a remote indication.

Hunting of the motor 2 will only be produced in this way when it is running in synchronism so, by visual inspection of the LED 98, or the remote indication provided by the optocoupler, it can be determined whether or not the motor is running in synchronism with the supply.

What I claim is:

1. A motor control system comprising three phase supply lines; switching means; means connecting said switching means in one of said supply lines; control means; means connecting said control means to said switching means, said control means causing switching of the switching means such that the supply of signals on said one supply line is intermittently varied by periodically interrupting or enabling the supply of signals to said motor for short intervals such as to cause hunting of the motor only when the motor is running in synchronism with the supply; means for detecting hunting of the motor; and means for indicating synchronous running of the motor in response to detected hunting of the motor.

2. A motor control system according to claim 1, wherein said control means opens the switching means in said one supply line when said motor has reached a predetermined speed so that power supply to said motor on said one line is thereby interrupted, and wherein the control means subsequently periodically closes the switching means to enable power supply to the motor on said one line for short intervals such as thereby to cause hunting of the motor.

3. A motor control system according to claim 2, including monitor means responsive to the back EMF of the motor, said monitor means providing an output in response to hunting of the motor.

4. A motor control system according to claim 1, including further switching means, means connecting said further switching means in another of said supply lines, and means connecting said control means to said further switching means, said control means causing said further switching means to open periodically for short periods thereby interrupting the supply of signals on the other of said supply lines to produce hunting of the motor.

5. A motor control system comprising: three phase supply lines; first and second switching means; means connecting said first and second switching means respectively in a first and second of the supply lines; control means; means connecting said control means to said first and second switching means, said control means causing both said switching means to be initially closed such that power is supplied to said motor on all said lines, said control means causing said first switching means to be opened when said motor has reached a predetermined speed so that power supply to said motor on said first line is thereby interrupted, said control means subsequently periodically closing said first switching means to enable power supply to the motor on the first line for short intervals, and periodically opening said second switching means to prevent power supply to the motor on the second line for short intervals thereby to cause hunting of the motor only when the motor is running in synchronism with the supply; means for detecting hunting of the motor; means for indicating synchronous running of the motor in response to detected hunting of the motor; phase detector means; means connecting said phase detector means to receive signals from the first and second lines; said phase detector means being responsive to the phase relationship between signals on the first and second supply lines, said phase detector means being operable to open both the first and second switching means thereby to prevent supply of power to said motor when an undesired phase relationship occurs between said signals.

6. A method of controlling a three-phase motor, comprising the steps of supplying power to the motor, intermittently varying the supply of power on one line by periodically interrupting or enabling the supply of power on said one line to the motor for short intervals such as to cause hunting of the motor only when the motor is running in synchronism with the supply, detecting hunting of the motor, and indicating synchronous running of the motor in response to detected hunting of the motor.

7. A method according to claim 6, wherein power is supplied to the motor on all three phase lines until the motor has reached a predetermined speed, wherein power on one of said phase lines is subsequently interrupted so that the motor runs on power on only the other two lines.

8. A method according to claim 7, wherein power on one of the other two lines is periodically interrupted for short intervals such as to cause hunting of the motor.

9. A method of controlling a three-phase motor comprising the steps of: supplying power for the motor on all three phase lines until the motor has reached a predetermined speed; interrupting the supply of power to the motor on one line when the motor has reached a predetermined speed such that the motor runs on power on only the other two lines; subsequently enabling power supply on said one line periodically for short intervals to cause hunting of the motor; interrupting the supply of power to the motor on one of the other two lines periodically for short intervals to cause hunting of the motor only when the motor is running in synchronism with the supply; detecting hunting of the motor; indicating synchronous running of the motor in response to the detected hunting of the motor, and wherein the method also includes the steps of responding to the phase relationship between signals on the first and second supply lines and preventing supply of power to the motor on at least two of said lines if an undesired phase relationship occurs between the signals on the first and second supply lines.

10. A motor control system comprising: three phase supply lines; first switching means; means connecting said first switching means in one of said supply lines; second switching means; means connecting said second switching means in another of said supply lines; control means; means connecting said control means to said first switching means, said control means causing said switching means to open when said motor has reached a predetermined speed so that power supply to said motor on said one line is thereby interrupted; phase detector means, said phase detector means including a series-connected capacitor and unidirectional current device, means supplying signals derived from one of said supply lines to charge the said capacitor via the unidirectional current device, and means supplying signals derived from the other of said supply lines to control said unidirectional current device such as to prevent charging of said capacitor when an undesired phase relationship occurs between said signals so as thereby to prevent supply of power to said motor.

* * * * *